April 21, 1959

J. H. KELLER 2,882,744

CLUTCH OPERATING MECHANISM

Filed Sept. 23, 1954

Inventor
John H. Keller
By Paul Fitzpatrick
Attorney

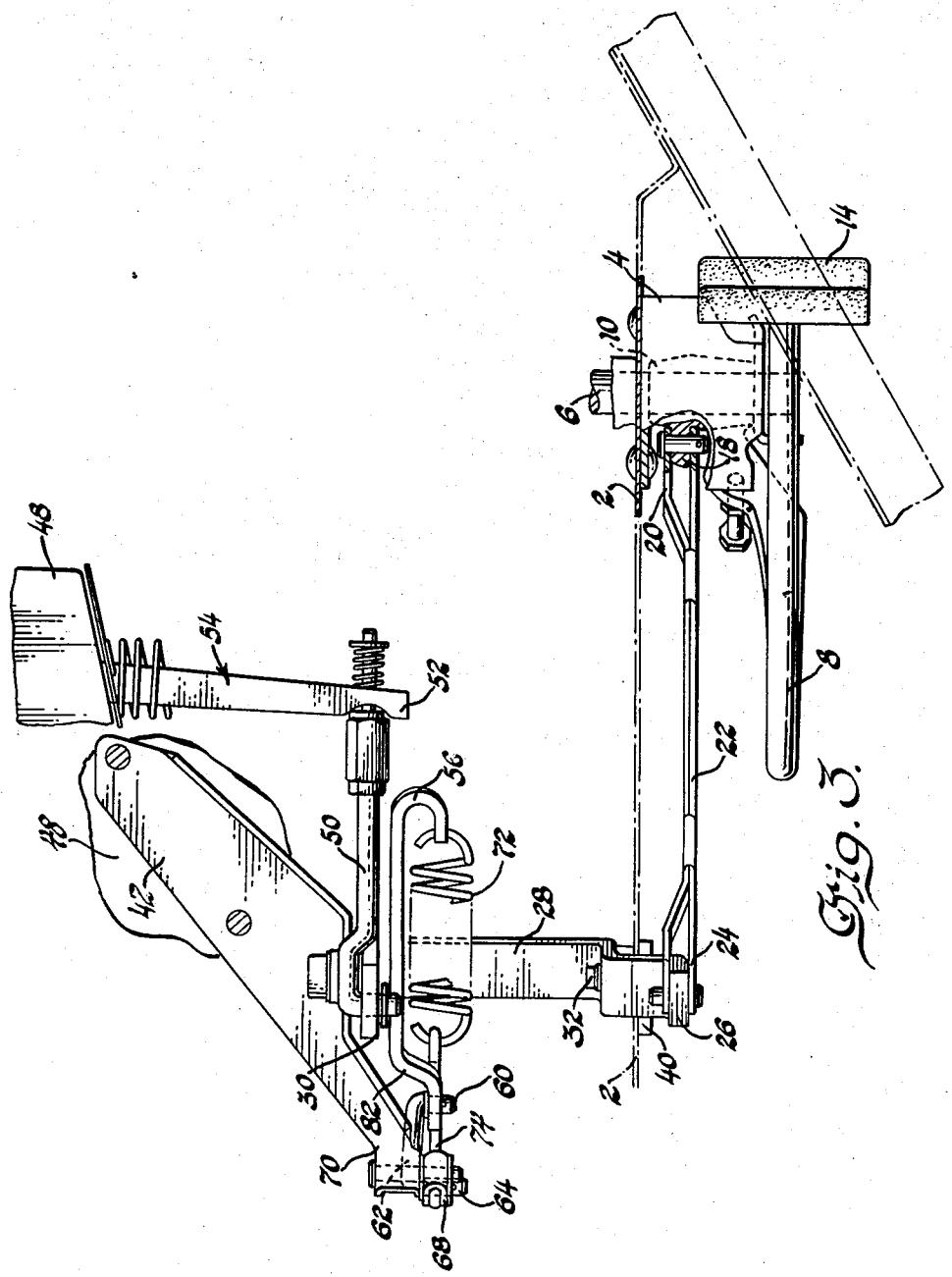

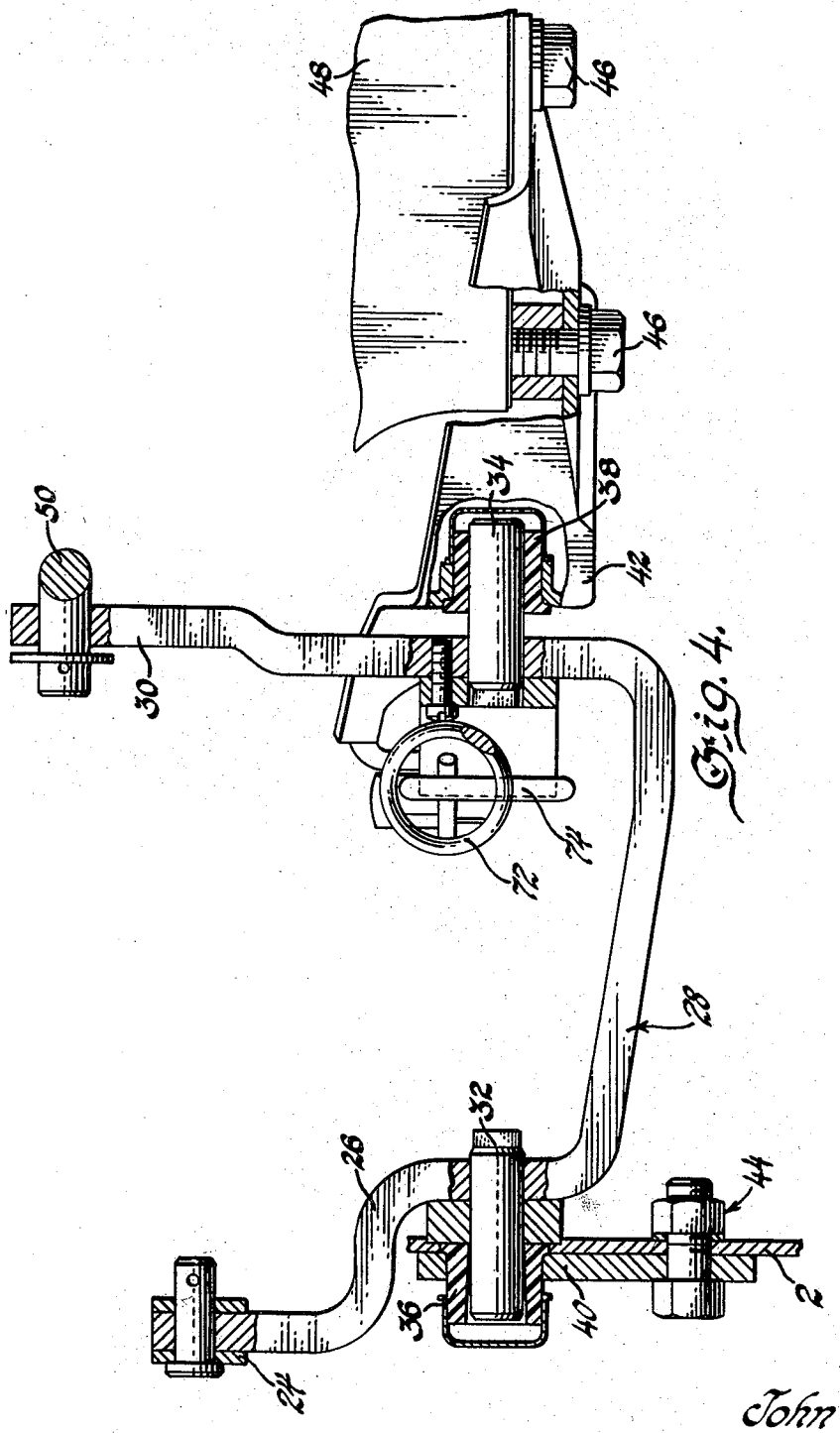

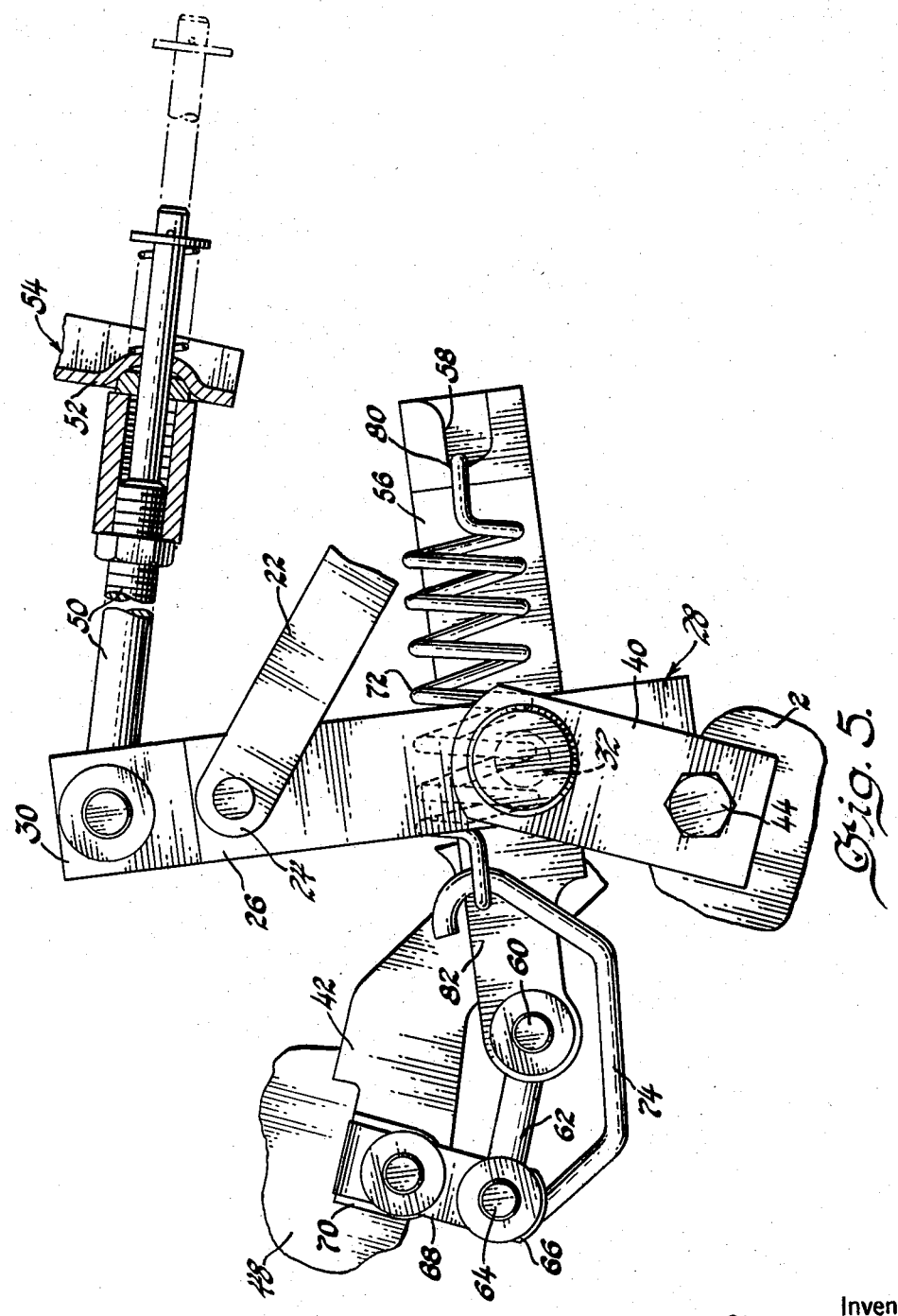

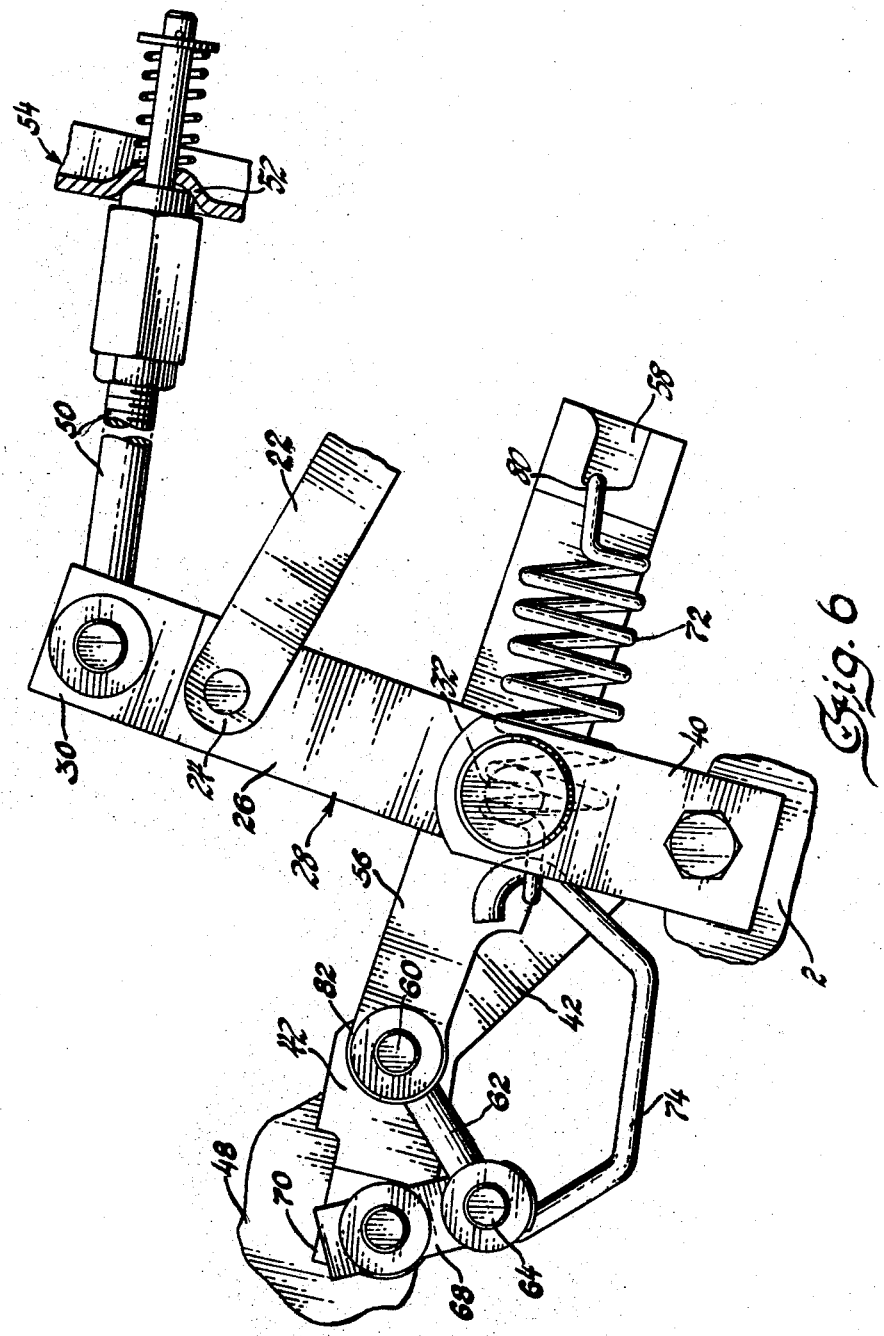

United States Patent Office 2,882,744
Patented Apr. 21, 1959

2,882,744

CLUTCH OPERATING MECHANISM

John H. Keller, Davisburg, Mich., assignor to General Motors Corporation, Detroit, Mich., a corporation of Delaware Application September 23, 1954, Serial No. 457,824

6 Claims. (Cl. 74—512)

This invention relates to clutch operating mechanisms and particularly to operating mechanisms wherein the operation of the clutch is assisted by reversible turning moment obtained from the latent energy of a spring.

An object of the present invention is to provide an overcenter spring clutch pedal assist mechanism capable of augmenting manual pedal pressure.

Another object is to provide a clutch control mechanism having an overcenter spring operatively associated therewith, the spring being connected in a manner providing resistance to initial depression of the clutch pedal and thereafter inducing reverse pressure tending to assist manual depression of the clutch.

A further object is to provide a mechanism of the type described having a linkage associated therewith capable of exerting progressively increasing assist force on the clutch pedal after predetermined initial manual depression thereof.

These and other objects and advantages of the invention will become more fully apparent as reference is had to the accompanying specification and drawings wherein:

Fig. 3 is a fragmentary plan view of the invention, showing its disposition with respect to a vehicle clutch assembly.

Fig. 4 is an enlarged fragmentary elevational view looking in the direction of arrows 4—4 of Fig. 1.

Fig. 5 is an enlarged fragmentary view, showing the relative position of the parts when the clutch operating mechanism is in clutch engaging position, and Fig. 6 is a view similar to Fig. 5, showing the relative arrangement of the parts when the clutch operating mechanism is in clutch released position.

Figure 1:
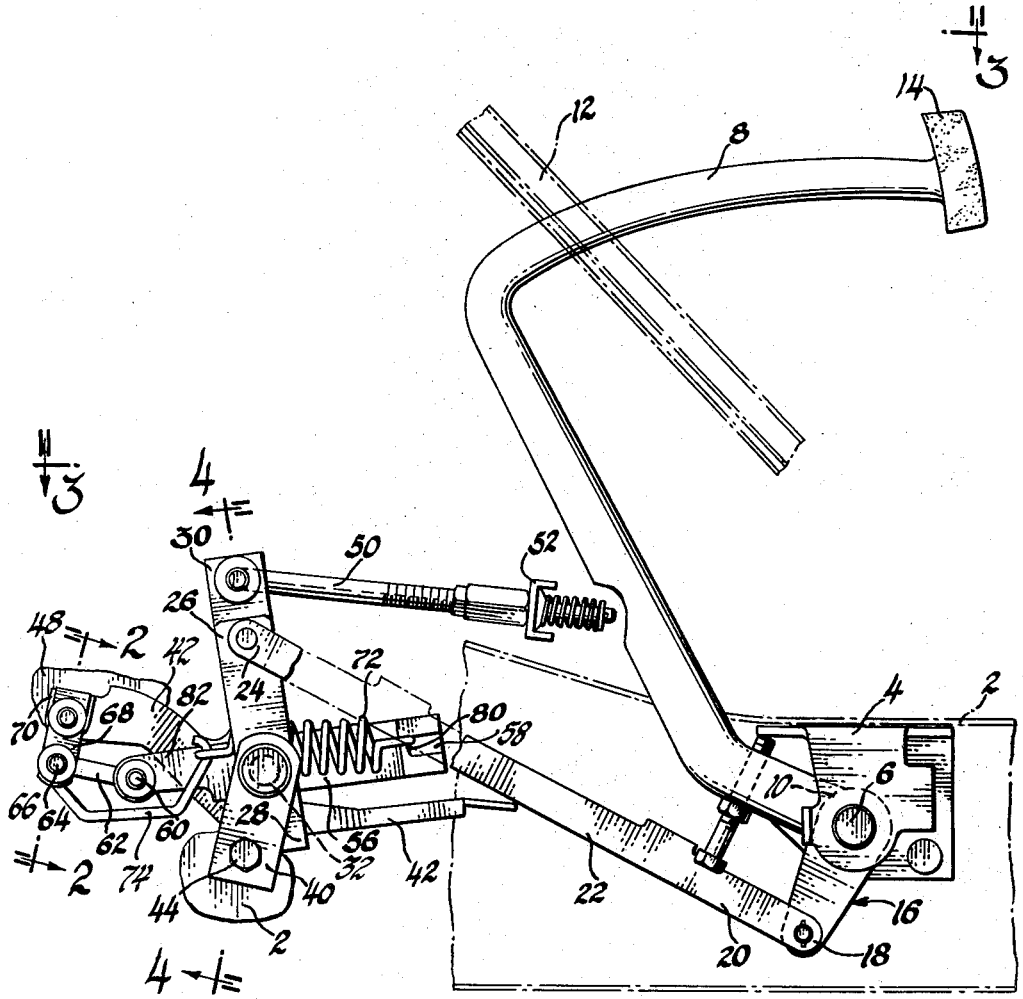
Fig. 1 is a fragmentary side elevational view with portions of the vehicle showing the structure, arrangement and location of the invention.
Figure 2:
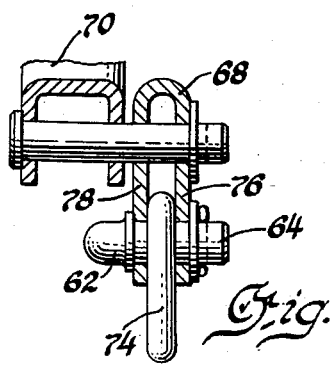
Fig. 2 is an enlarged front sectional elevational view looking in the direction of arrows 2—2 of Fig. 1.

Referring now to the drawings and particularly Figs. 1 and 3, there is illustrated a vehicle frame side member 2 having a depending bracket 4 secured thereto. Bracket 4 is provided with transversely extending openings through which extends a pivot shaft 6. A generally L-shaped control arm 8 is pivotally supported at its lower end 10 on shaft 6 and extends upwardly through the inclined portion 12 of a vehicle underbody. At its upper extremity, arm 8 is provided with a conventional foot engageable pedal 14. Formed integrally on lower extremity 10 of arm 8 is a relatively short depending lever arm 16, which at its lower end 18 is pivotally connected to the rear end 20 of forwardly extending pull rod 22. Rod 22, in turn, is pivotally connected at its forward end 24 to an upwardly extending arm 26. Arm 26 is integral with and extends upwardly from the outer end of a yoke-like cross member 28. At its inner end, cross member 28 is formed with a second integral upstanding arm 30 which is aligned in substantially parallel relation with arm 26. Cross member 28 is mounted for pivotal movement on a transverse axis by means of axially aligned pivot studs 32 and 34, the inner ends of which are press fitted in the arms 26 and 30. Studs 32 and 34 are, in turn, rotatably supported in bushings 36 and 38 which are secured, respectively, in brackets 40 and 42. Bracket 40 is secured to the vehicle side frame member 2 by bolt and nut 44, while bracket 42 is secured by bolts 46 to the vehicle engine fly wheel housing 48. At its upper extremity, arm 30 is pivotally connected to a rearwardly extending push rod 50, the opposite end of which operatively engages the free end 52 of clutch fork 54. It will be understood that the clutch assembly, not shown, is of conventional construction and is arranged in a manner whereby disengagement thereof is affected by rearward swinging movement of the outer end 52 of clutch fork 54. Therefore, it will be seen that upon depression of pad 14, clutch arm 8 swings counterclockwise about pivot 6 while lever arm 16 swings arcuately rearwardly therewith. As lever 16 moves rearwardly, pull rod 22 causes cross member 28 to rotate clockwise which, in turn, actuates push rod 50 rearwardly to swing the outer end 52 of clutch fork 54 rearwardly and bring about disengagement of the clutch assembly. It will be understood that upon release of pressure on pedal 14, springs in the internal clutch construction, not shown, cause clutch fork 54 to swing forwardly and reverse the path of movement of the mechanism. The parts will, therefore, return to the position shown in Fig. 1.

In the past, conventional clutch operating mechanisms have been provided with separate spring means adapted to resiliently maintain the clutch pedal arm 8 in the engaged position shown in Fig. 1, in order to relieve the internal clutch springs of load imposed by the operating mechanism. Since springs or other devices capable of accomplishing this result necessarily impose a substantial initial resistance to manual clutch pedal depression and progressively increasing resistance during depression of the pedal, maintaining the clutch pedal in depressed or clutch released position has heretofore involved considerable manual effort. Particularly in areas of congested traffic, where continuous use of the clutch is required, the relatively high pressure required to maintain the clutch in released position tends to produce operation fatigue. To overcome this difficulty in accordance with the present invention, there is provided a clutch pedal assist mechanism which forms a part of the clutch operating mechanism and cooperates therewith. As shown particularly in Fig. 5, the cross member 28 is provided with an intermediate generally longitudinally extending arm 56 which is rigidly secured thereto at right angles to arms 26 and 30. Arm 56 intersects the pivotal axis defined by pivot shafts 32 and 34 and in normal position is inclined slightly from the horizontal so that the rear notched end 58 thereof lies in a plane slightly above the axis of pivots 32 and 34. At its forward end, arm 56 is pivotally connected to one end 60 of intermediate U-shaped link 62. At its opposite end 64, link 62 pivotally engages the lower end 66 of a second link 68. Link 68, in turn, is pivoted at its upper end to the forward extremity 70 of bracket 48. A coil spring assembly 72 is disposed in tension between the notched end 58 of arm 56 and one end of a generally C-shaped hook 74, the opposite end of which embraces the end 64 of link 62 between the walls 76 and 78 of depending link 68.

From Fig. 5, it will be evident that spring 72 exerts a force on arm 56 which tends to cause counterclockwise movement of cross member 28 and that upon clockwise movement of cross member 28 resulting from pressure on pedal 14, the rear notched end 58 of arm 56 will swing downwardly until the point of engagement 80 between spring 72 and notch 58 intersects a line extending between end 64 of link 62 and the axis of rotation of cross member 28, or until the spring passes "overcenter." Once spring 72 has passed over center, i.e., passed the axis of the arm 56, it induces a clockwise turning movement of cross member 28 and assists further manual depression of pedal 14. As should be apparent, if the illustrated system represented a balanced or symmetrical over center arrangement, increased initial pedal pressure resulting from the force exerted by spring 72 would exactly equal the decrease in pedal pressure required with the pedal fully depressed. However, because of the novel arrangement of link 62 and 68 and the manner of coaction thereof with spring 72 and arm 56, there is produced an asymmetrical toggle action which induces turning moment on cross shaft 28 at the fully depressed position (Figure 6) nearly doubled that of the opposite turning moment induced when cross shaft 28 is in the fully released position (Figure 5).

As seen in Figure 6, when arm 56 swings clockwise with cross shaft 28, the forward end 82 of the arm swings arcuately upwardly causing the end 60 of link 62 to move therewith. Due to the upward and forward movement of end 60, link 62 moves from a substantially horizontal position to the relatively steeply inclined position shown in Fig. 6. Simultaneously, the lower end of link 68 swings arcuately rearwardly with the end 64 of link 62. Consequently, the total turning moment exerted on cross shaft 28 when the pedal 14 is in depressed position results from the combined force exerted by the spring 72 acting directly on the rear end 58 of arm 56 and the force exerted on the forward end 82 of such arm by the toggle action of link 62 and 68. Since the geometry of the toggle action of link 62 and 68 is asymmetrical, as previously stated, virtually no reverse turning moment is induced thereby when the pedal 14 is in the extended position. Therefore, initial resistance to depression of pedal 14 is opposed only by the force of spring 72 acting directly on the rear end 58 of arm 56. Thus, although spring 72 is tensioned a substantially equal amount when the mechanism is at opposite limits of operation, as the arm 56 passes over center in the clockwise direction, additional forces exerted by the toggle of linkage 62, 68 augment the normal turning moment resulting from direct over center spring action and progressively increase the turning moment on cross shaft 28 until it reaches the full clutch disengaging position.

While but one embodiment of the invention is shown and described, it will be apparent that other changes and modifications may be made therein. It is, therefore, to be understood that it is not intended to limit the invention to the embodiment shown but only by the scope of the claims which follow.

I claim:

1. In a mechanical system comprising a normally engaged clutch, apparatus for effecting disengagement of said clutch comprising: means manipulated by an operator, a pivotally mounted cross member, linkage means connecting said operator-manipulated means and said cross member, linkage means between said cross member and said clutch, an arm fixed to said cross member and extending transversely thereof, a fixed support, linkage means between said fixed support and said arm, said last linkage means having pivotal connection with said support and including a toggle, a spring connected at one end to said arm, and means operably connecting the other end of said spring to said toggle, said spring in operation having a first position off-center with relation to the axis defined by an imaginary line passing through the center of the joint of said toggle and of the pivotal axis of said cross member whereat it constitutes a resistance to clutch-disengaging rotation of said cross member and a second position off-center with relation to said axis whereat it aids such rotation, said toggle furthering the action of said spring in its said second position.

2. In a mechanical system comprising a normally engaged clutch, apparatus for effecting disengagement of said clutch comprising: means manipulated by an operator, a pivotally mounted cross member, linkage means connecting said operator-manipulated means and said cross member, linkage means between said cross member and said clutch, an arm fixed to said cross member and extending transversely thereof, a fixed support spaced from one end of said arm, a linkage element pivoted to said support, a second linkage element interconnecting said first element and said end of said arm, said linkage elements being arranged to form a toggle, a spring connected at one end to said arm and means operably connecting the other end of said spring to said toggle, said spring in operation having a first position off-center with relation to the axis defined by an imaginary line passing through the center of the joint of said toggle and of the pivotal axis of said cross member whereat it constitutes a resistance to clutch-disengaging rotation of said cross member and a second position off-center with relation to said axis whereat it aids such rotation, said toggle furthering the action of said spring in its said second position.

3. In a mechanical system comprising a normally engaged clutch, apparatus for effecting disengagement of said clutch comprising: means manipulated by an operator, a pivotally mounted cross member, linkage means connecting said operator-manipulated means and said cross member, linkage means between said cross member and said clutch, an arm fixed to said cross member and intersecting the pivotal axis thereof, a fixed support spaced from one end of said arm, linkage means between said fixed support and said end of said arm, said last linkage means having pivotal connection with said support and including a toggle, a spring anchored at one end to the other end of said arm, and means operably connecting the other end of said spring to said toggle, said spring in operation passing over-center with relation to the axis defined by an imaginary line passing through the center of the joint of said toggle and of the pivotal axis of said cross member incident to clutch-disengaging rotation of said cross member whereby it initially constitutes a resistance to such rotation but subsequently aids such rotation, said toggle furthering the action of said spring following its passage over center.

4. In a mechanical system comprising a normally engaged clutch, apparatus for effecting disengagement of said clutch comprising: means manipulated by an operator, a pivotally mounted cross member, linkage means connecting said operator-manipulated means and said cross member, linkage means between said cross member and said clutch, an arm fixed to said cross member and intersecting its pivotal axis, a fixed support spaced from one end of said arm, a linkage element pivoted to said support, a second linkage element pivotally connected to said first element and to said end of said arm, said linkage elements being arranged to form a toggle, a spring anchored at one end to the other end of said arm and means operably connecting the other end of said spring to said elements at the point of pivotal connection thereof, said spring in operation passing over-center with relation to the axis defined by an imaginary line passing through the center of the joint of said toggle and of the pivotal axis of said cross member incident to clutch-disengaging rotation of said cross member whereby it initially constitutes a resistance to such rotation but subsequently aids such rotation, said toggle furthering the action of said spring following its passage over center.

5. In a mechanical system comprising a normally engaged clutch, apparatus for effecting disengagement of said clutch comprising: a pedal member, a pivotally mounted cross member, linkage means connecting said pedal member and said cross member, linkage means between said cross member and said clutch, and arm fixed to said cross member at right angles thereto and intersecting the pivotal axis thereof, a fixed support spaced from one end of said arm, a linkage element pivoted to said support, a second linkage element pivotally connected to said first element and to said end of said arm, said linkage elements being arranged to form a toggle, a spring anchored at one end to the other end of said arm and means operably connecting the other end of said spring to said elements at the point of pivotal connection thereof, said spring in operation passing over center with relation to the axis defined by an imaginary line passing through the center of the joint of said toggle and of the pivotal axis of said cross member incident to clutch disengaging rotation of said cross member whereby it initially constitutes a resistance to such rotation but subsequently aids such rotation, said toggle furthering the action of said spring following its passage over center.

6. In a mechanical system comprising a normally engaged clutch, apparatus for effecting disengagement of said clutch comprising: a pedal member, a pivotally mounted, generally U shaped cross member, linkage means extending between one leg of said cross member and said pedal member, linkage means interconnecting the other leg of said cross member and said clutch, an arm fixed to a leg of said cross member at right angles thereto and intersecting the pivotal axis thereof, a fixed support spaced from one end of said arm, a linkage element pivoted to said support, a second linkage element pivotally connected to said first element and to said end of said arm, said linkage elements being arranged to form a toggle, a spring anchored at one end to the other end of said arm and a hook-like member operably connecting the other end of said spring to said elements at the point of pivotal connection thereof, said spring in operation passing over center with relation to the axis defined by an imaginary line passing through the center of the joint of said toggle and of the pivotal axis of said cross member incident to clutch disengaging rotation of said cross member whereby it initially constitutes a resistance to such rotation but subsequently aids such rotation, said toggle furthering the action of said spring following its passage over center.

References Cited in the file of this patent

UNITED STATES PATENTS

| | | |
|---|---|---|
| 1,540,247 | Bowman | June 2, 1925 |
| 2,170,172 | Wemp | Aug. 22, 1939 |
| 2,621,538 | Bechman et al. | Dec. 16, 1952 |

FOREIGN PATENTS

| | | |
|---|---|---|
| 478,968 | Great Britain | Jan. 27, 1938 |